May 24, 1966 I. B. YOUNG, JR 3,252,434
DISPLAY RACK
Filed May 25, 1964 5 Sheets-Sheet 1

FIG.1

INVENTOR
IRA BRUCE YOUNG, Jr.
BY Shoemaker and Mattare
ATTORNEYS

INVENTOR
IRA BRUCE YOUNG, Jr.

BY Shoemaker and Mattare
ATTORNEYS

United States Patent Office 3,252,434
Patented May 24, 1966

3,252,434
DISPLAY RACK
Ira Bruce Young, Jr., 4215 Cromwell Road,
P.O. Box 8247, Chattanooga, Tenn. 37411
Filed May 25, 1964, Ser. No. 369,872
10 Claims. (Cl. 108—111)

The present invention relates to a new and novel display rack, and more particularly to a display rack which is formed of a plurality of separate components which may be quickly and easily assembled and disassembled with respect to one another.

The present invention is particularly directed to a lightweight display rack such as may be utilized in stores and supermarkets and the like for supporting articles for sale thereon. In a typical example, the display rack of the present invention may be employed for supporting potato chips, crackers, and other foodstuffs or any type of article which may be for sale.

It is accordingly apparent that the display rack of the present invention must present a pleasing appearance to the eye, and at the same time must be sufficiently rugged and sturdy to support articles thereon and to withstand shock and rough use and abuse which may occur in the areas wherein the display rack is to be employed.

It is also important from an economical standpoint to provide a display rack which can be easily packaged or stored in a minimum amount of space and which can be shipped economically. In order to accomplish this, the display rack of the present invention includes a lightweight open type framework which can be folded up into a very compact area, and a plurality of separate shelves are provided.

The framework and the shelves can be readily assembled and interengageable means is provided on the framework and the shelves which permits the shelves to be locked into operative position so as to firmly support the shelves and to form a substantially rigid overall unit.

The shelves are constructed so as to be readily mounted in operative position and rounded back corner portions are provided on the shelves so as to permit the shelves to be easily assembled in the framework in its erected position and further permitting the shelves to be readily removed and adjusted as to position on the framework when desired.

The framework itself includes a pair of back panels which are pivotally interconnected with one another and a pair of side panels which are pivotally interconnected with opposite side edges of the back panels. Each of the panels as well as the shelf means is preferably formed of an open framework construction composed of a suitable metallic substance such as wire. This affords a most simple and inexpensive construction and such an arrangement enjoys many manufacturing advantages, while at the same time providing in the erected assembled relationship a very sturdy and rugged unit.

The two back panels are substantially identical with one another, and the two side panels are also substantially identical with one another to facilitate manufacture and to reduce the overall cost since it is not necessary to provide a special construction for the left and right hand sides of the apparatus.

Means is also provided on the framework as well as on the shelf means to support suitable display or advertising panels and placards and the like in operative position on the rack.

An object of the present invention is to provide a new and novel display rack which is composed of a plurality of separate components which may be quickly and easily assembled and disassembled with respect to one another and wherein the shelves are particularly constructed so as to permit ready installation and adjustment thereof with respect to the supporting framework.

Another object of the invention is the provision of a display rack of an open lightweight framework type which can be easily packaged and stored in a minimum space and which can be shipped economically.

Still another object of the invention is to provide a display rack including a framework which is adapted to be folded up along with separate shelf means, the framework and the shelf means including interengageable locking means to hold the assembled rack in a substantially rigid erected position.

Yet another object of the invention is to provide a display rack including a framework having back and side panels wherein the back panels are substantially identical and the side panels are substantially identical to facilitate manufacture and reduce cost of the apparatus.

A still further object of the invention is the provision of a display rack including a framework having means thereon for supporting display or advertising panels or placards, and wherein the shelf means is also provided with a means for supporting such devices.

Still another object of the invention is to provide a display rack which is quite simple and inexpensive in construction, and yet which is quite sturdy and reliable in use.

Other objects and many attendant advantages of the invention will become more apparent when considered in connection with the specification and accompanying drawings, wherein.

Referring now to the drawings wherein like reference characters designate corresponding parts throughout the several views, a first modification of the invention is illustrated in FIGS. 1 through 9 inclusive. As seen in these figures, the display rack of the present invention includes a framework comprising a pair of back panels 30 and 32 which are pivotally interconnected with one another as hereinafter described, and a pair of side panels 34 and 36 are swingably connected to the outer edge portions of the back panels 32 and 30, respectively, as hereinafter described.

Figure 1:
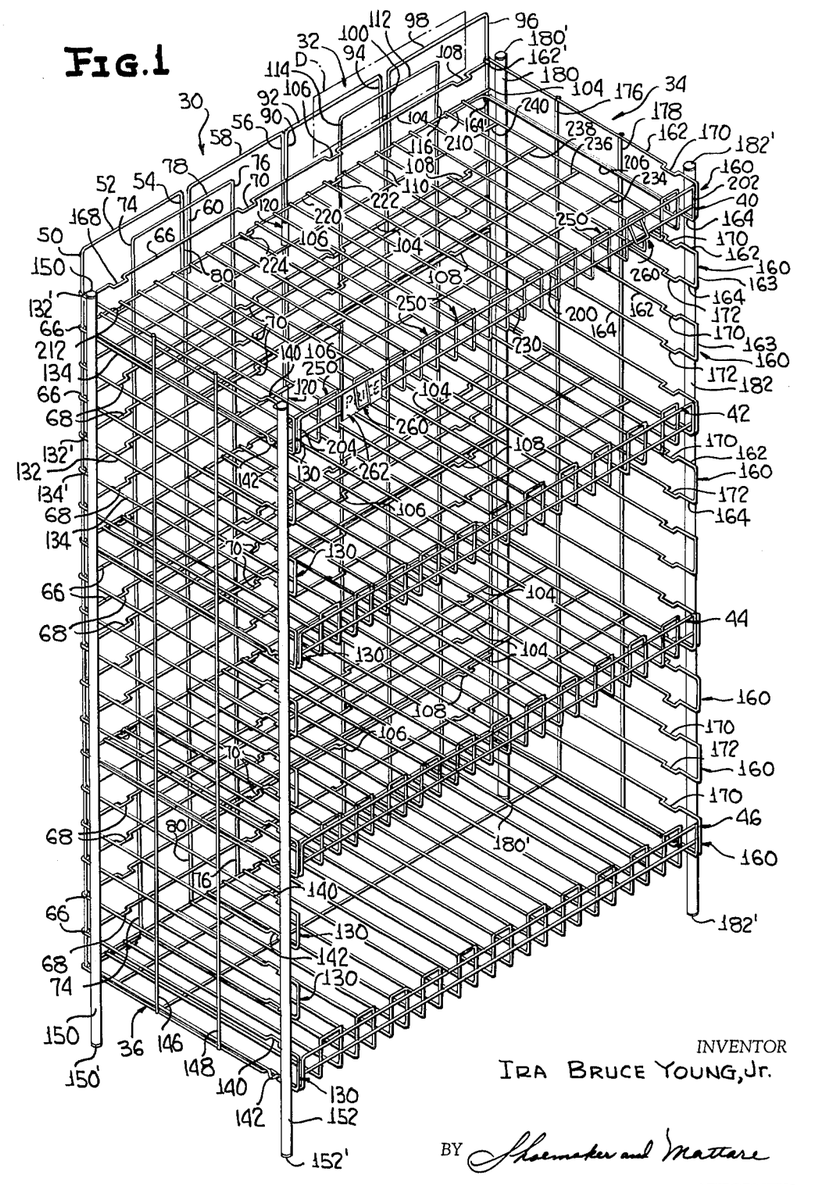
FIG. 1 is a top perspective view of a first embodiment of the present invention.
Figure 2:
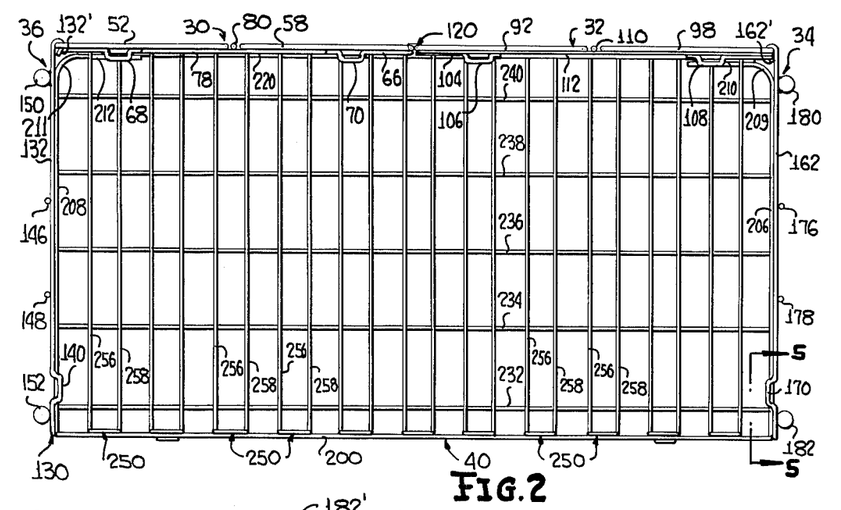
FIG. 2 is a top view of the structure shown in FIG. 1, it being understood that each of FIGS. 1 and 2 illustrate the apparatus in its erected operative position.

The apparatus is illustrated in its erected operative position as seen in FIG. 1, and a plurality of shelf means may be supported upon the framework, these shelves being supported in any desired spaced relationship with respect to one another. It will be understood that any number of shelves may be employed with the framework, and four such shelves indicated by reference numerals 40, 42, 44 and 46 are illustrated in operative position in FIG. 1 of the drawings.

Both the various panels of the framework and the shelves are each formed of a lightweight open construction comprising a plurality of members which are preferably formed of steel wire or the like, these members being rigidly interconnected with one another at certain points as by welding and the like. It will be understood that the wire members are of fairly heavy-duty construction, yet are quite resilient. Although the individual members out of which the various panels and shelves are constructed are quite resilient, it will be recognized that the over-all structure is quite rigid due to the welded interconnection between the various wire members. It will be apparent that certain portions of the structure may comprise members other than wire members, and as noted hereinafter the support portions of the apparatus are in fact tubular members, although these members may also be formed as heavy wire members if so desired.

As seen in FIG. 1, the first back panel 30 includes a first side edge member 50 having a horizontally disposed leg portion 52 at the upper end thereof which terminates in a depending portion 54 which extends downwardly a limited distance. A similar opposite side edge member 56 includes a horizontally extending top leg portion 58 which joins with a depending terminal portion 60 similar to the portion 54.

A plurality of horizontal members 66 have the opposite ends thereof rigidly secured to members 50 and 56 as by welding or the like, members 66 being disposed in substantially parallel relationship to one another and being positioned at spaced points throughout the length of members 50 and 56 as will be apparent from an inspection of FIG. 1.

Each of members 66 includes a pair of spaced inwardly extending offset portions 68 and 70, the purpose of these inwardly extending offset portions being hereinafter described. These offset portions 68 and 70 lie substantially in a horizontal plane when the apparatus is in its erected operative relationship.

An elongated substantially U-shaped member includes vertically extending leg portions 74 and 76 and an upper horizontally extending connecting portion 78. Each of the vertically extending leg portions 74 and 76 is rigidly secured as by welding to the back surface of each of the horizontal members 66 previously described. The leg portions 74 and 76 extend downwardly to a horizontal level substantially the same as that of the lower portions of members 50 and 56 so that the lowermost horizontal member 66 is interconnected with the bottom portions of members 50, 56, 74 and 76.

A vertically extending member 80 which comprises a straight piece of wire is secured to the medial back portions of each of the horizontal members 66 and extends downwardly to the same horizontal level as the lower ends of portions 50, 56, 74 and 76.

After the components thus far described in connection with back panel 30 have been welded together as described up to this point, the panel is run through a press and the offsets 68 and 70 are formed therein, it being understood that members 66 are first formed as flat rods or wires. At this time, the depending leg portions 54 and 56 are loose and not interconnected with any other members. As the offsets are formed, it will be apparent that leg portions 54 and 60 will move inwardly toward one another until they are in the position illustrated in FIG. 1. After reaching this position, the depending leg portions 54 and 60 are welded to the two uppermost horizontal members 66, but they are not welded to the connecting member 78 for a purpose hereinafter described.

The back panel 32 is of substantially identical construction to the back panel 30 and includes a first side edge member 90 having a horizontally extending leg portion 92 at the upper end thereof which terminates in a downwardly extending leg portion 94. This back panel also includes an opposite side member 96 having a horizontally extending leg portion 98 at the upper end thereof which terminates in a depending leg portion 100 which of course extends substantially parallel with leg portion 94.

A plurality of substantially horizontally disposed members 104 are provided, these members being substantially identical in construction with the members 66 previously described, the opposite ends of members 104 being suitably secured as by welding to the vertically extending side members 90 and 96. Each of members 104 is provided with a pair of spaced inwardly extending offset portions 106 and 108 similar to those previously described. These offset portions 106 and 108 lie substantially in a horizontal plane as is the case with the offset portions 68 and 70 previously described.

A vertically extending member 110 is secured to the medial back portions of each of the horizontal members 104, and this back panel is manufactured in the same manner as the previous back panel such that the depending leg portions 94 and 100 are not secured to the connecting portion 112 of a substantially U-shaped member including depending vertical leg portions 114 and 116 which are each welded to the back portions of the cross members 104. The depending leg portions 94 and 100 are however rigidly attached to cross members 104 at the upper portion of the framework.

The upper portion of each of the back panels is adapted to support a suitable display device or placard which is indicated in FIG. 1 as being positioned on back panel 32, the placard being indicated by reference letter D and indicated in phantom lines. This placard is typically formed of cardboard or similar material and may be inserted between portions 92, 94, 98 and 100 which are adapted to engage the back face of the placard, while the portions 114, 112 and 116 are adapted to engage the forward face of the placard. It should be understood that these various portions 112, 114 and 116 will exert spring pressure on the front of the placard and the placard will be tightly held against the portions in engagement with the back face thereof such that the display device is held in a desired operative position where it can be readily viewed by persons standing in front of the display rack. It is apparent that a similar device can be inserted in a like location in the back panel 30 if desired.

Figure 7:
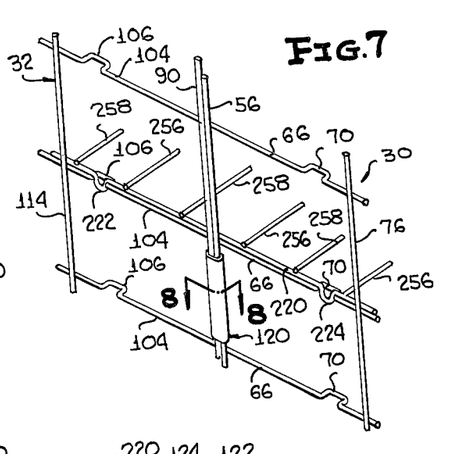
FIG. 7 is a top perspective view of a portion of the interconnected back panels of the framework.
Figures 8, 9:
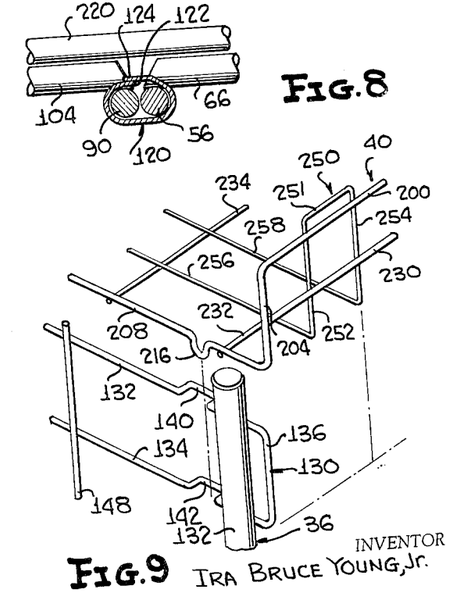
FIG. 8 is a sectional view taken substantially along line 8—8 of FIG. 7 looking in the direction of the arrows.
FIG. 9 is a top exploded view illustrating the manner of assembly of the shelf means on the side panels.

As seen particularly in FIGS. 1, 7 and 8, the two back panels are pivotally interconnected with one another by a plurality of hinge members indicated generally by reference numeral 120. In FIG. 1, two of the hinge members are illustrated, and it will be understood that two more hinge members may be provided at similarly spaced portions along the edge members 56 and 90 of the two back panels in order to provide the desired pivotal interconnection. It is obvious that any number and desired spacing of hinge members may be employed as desired.

As seen most clearly in FIG. 8, each of the hinge members 120 comprises a sheet of metallic material which is bent into an oblong cross sectional configuration with the opposite edge portions 122 and 124 thereof in overlapping relationship. This sheet of material is sufficiently strong so as to maintain its configuration as shown in FIG. 8 whereby it is apparent that members 90 and 56 are pivotally interconnected with one another, these members being held in side by side relationship but being free to rotate with respect to one another.

As seen most clearly in FIGS. 1 and 9, the side panel 36 includes a plurality of generally U-shaped members indicated by reference numerals 130, each of these members including an upper leg portion 132 and a lower leg portion 134 joined at the forward ends thereof by a connecting portion 136. The rear end portions 132' and 134' of the leg portions 132 and 134 respectively are looped around the vertically extending framework member 50 whereby the side panel 36 is swingably or pivotally interconnected with the outer edge portion of the back panel 30.

The leg portions 132 and 134 are provided with inwardly extending offset portions 140 and 142 respectively, these two inwardly offset portions lying substantially in horizontal planes when the apparatus is in its erected operative position. These offset portions serve as interengageable portions to engage a portion of the shelves hereinafter described to lock the structure in its erected position.

As seen most clearly in FIG. 1, a pair of vertically extending members 146 and 148 which may be wires and the like are connected to spaced outer portions of the leg portions 132 and 134 of each of members 130 to provide a rigid side panel structure.

A pair of tubular members 150 and 152 are secured as by welding to the outer faces of the leg portions 132 and 134, these tubular portions 150 and 152 being formed of a suitable metallic substance and preferably having inserts 150' and 152' inserted in the opposite open ends thereof, these inserts being of plastic or a suitable wear-resistant material. As mentioned previously, any suitable support means may be employed, it being considered preferable to provide tubular members as shown.

The side panel 34 is of similar construction to the side panel 36 and includes a plurality of generally U-shaped members indicated by reference numeral 160, each of these U-shaped members including an upper leg portion 162 and a lower leg portion 164, these upper and lower leg portions being joined by a connecting portion 163. The rear ends of the leg portions 162 and 164 are indicated by reference numerals 162' and 164' respectively and are looped around the vertically extending frame member 96 whereby the side panel 34 is swingably or pivotally interconnected with one side edge of the back panel 32.

The upper and lower leg portions 162 and 164 of each of members 160 are provided with inwardly extending offset portions 170 and 172 respectively each of which lies in a substantially horizontal plane in the erected operative position of the apparatus.

A pair of vertically extending members 176 and 178 are secured to spaced portions of the outer surfaces of each of the leg portions 162 and 164 and are connected as by welding or the like so as to provide a rigid side panel construction.

A pair of support members 180 and 182 which may be of tubular metallic construction are welded to the outer surfaces of the leg portions 162 and 164 of each of members 160, the opposite end portions of these tubular support portions receiving suitable wear-resistant inserts 180' and 182' respectively.

Referring now particularly to FIGS. 1, 2 and 5–7 and 9 in particular, the details of construction of the shelf means of the present invention will become apparent. Each of the shelf means 40, 42, 44 and 46 is of identical construction, and accordingly a description of the specific details of construction of shelf 40 will suffice for each of the shelves.

The shelf means includes a first integral member including a horizontally extending upper forward portion 200 which extends downwardly at either end thereof to define portions 202 and 204 which in turn join with rearwardly extending portions 206 and 208 respectively which extend rearwardly and curve at their rearward portions into short extending portions 212 which are substantially parallel with the forward portion 200 thereof. It will be understood that the various portions of this member are disposed in horizontal planes with the exception of the portions 202 and 204 which extend in substantially vertical planes.

The rearwardly extending portions 206 and 208 of this integral member are provided with integral depending offset portions 214 and 216 respectively which lie in substantial vertical planes in normal operative position, these offset portions 214 and 216 being adapted to fit respectively within the offset portions 172 and 142 previously described in connection with the side panels. While the offset portions 214 and 216 may be disposed in the offset portions 172 and 142, they may also be positioned within the offset portions 170 and 140 respectively if desired, depending on the particular horizontal level at which it is wished to position a particular shelf.

The shelf is provided with a rear edge member 220 which has the opposite end portions thereof secured to the portions 210 and 212 as by welding. Member 220 is provided with a pair of spaced integral depending offset portions 222 and 224 which lie substantially in a vertical plane when in operative position and which are adapted to fit respectively within the offset portions 106 and 70 provided on back panels 32 and 30, respectively. It should also be understood that the rear edge portion of the shelves may be provided with additional depending offset portions to fit within the offset portions 108 and 68 of the back panels 32 and 30 if so desired.

A horizontally extending member 230 has the opposite ends thereof secured to the portions 202 and 204 and serves to rigidify the front wall portion of the shelf.

A plurality of horizontally extending members shown as being five in number and indicated by reference numerals 232, 234, 236, 238 and 240 have the opposite end portions thereof secured to the undersurfaces of the portions 206 and 208. These latter members 232–240 inclusive serve to rigidify the shelves longitudinally thereof.

The shelf also includes a plurality of generally U-shaped members indicated by reference numerals 250 and which include as seen most clearly in FIG. 9 a forward upper connecting portion 251 which interconnects vertically depending portions 252 and 254 which in turn join with horizontally extending leg portions 256 and 258. The depending leg portions 252 and 254 are each welded to the inner surfaces of members 220 and 230, while the horizontally extending leg portions 256 and 258 are each welded to the upper surfaces of members 232–240 inclusive, the rear ends of the leg portions 256 and 258 being welded to the upper surface of the rear connecting member 220.

It is apparent that with this over-all shelf construction, a rigid shelf is provided having a main supporting portion as defined by the upper surfaces of the leg portions 256 and 258, and a forward wall portion is defined by portions 252 and 254 as well as portions 200 and 230. It is also apparent that the shelves are adapted to be mounted on the supporting framework with the depending offset portions of each shelf disposed within an offset portion provided on one of the panels of the framework whereby the shelves are held in the proper operative position and the overall display rack is maintained in a sturdy, erected upright position.

It is of course apparent that the shelves may be disposed in any particular horizontal plane in the supporting framework, and accordingly maximum versatility of the apparatus is provided since the shelves can be spaced from one another as required for any particular application.

As seen most clearly in FIG. 1, the shelves may also be provided with suitable means for supporting a display device, price tag or similar article thereon. This takes the form of a generally U-shaped wire member 260, two of these wire members being illustrated as mounted on the uppermost shelf 40. Each of these U-shaped members has the opposite legs thereof secured adjacent the ends thereof to the inner surface of the member 200, while the connecting portion thereof is disposed outwardly of the member 230. The leg portions of the U-shaped members 260 are urged against the outer surface of member 230, and it is apparent that a suitable article such as indicated by reference numeral 262 in FIG. 1 may be inserted between member 260 and member 230 and will be clamped in operative position so as to be readily observed by a person standing in front of the rack. It will be apparent that any number of these display support members may be mounted on the forward wall portion of each of the shelves as desired.

A particularly important feature of the present invention is the fact that the various components of the display rack can be disassembled and placed in a very small space. It is apparent firstly that the shelves may be disassembled from the supporting framework and the shelves can be nested upon one another such that a large number of shelves can be placed in a relatively small area.

Figure 3:
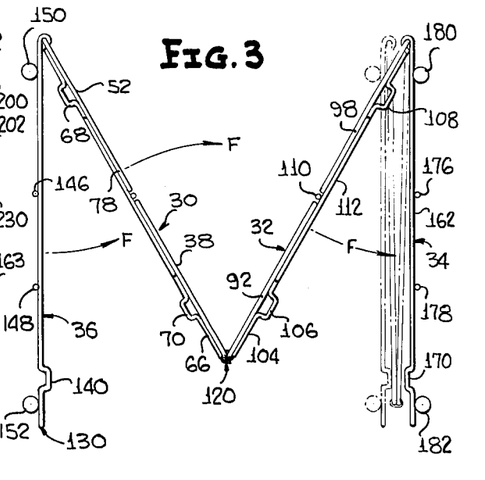
FIG. 3 is a top view of the supporting framework with the shelf means removed and illustrating the manner in which the framework is adapted to be folded up.

In addition, the framework includes substantially planar panel members, the front and side panels being pivotally interconnected with one another such that the entire framework can be folded up into a flat compact arrangement. FIG. 3 illustrates an intermediate step in the folding operation wherein the framework is being folded as indicated by the arrows F in this figure so as to move the framework into the phantom line position illustrated in FIG. 3.

Figure 4:
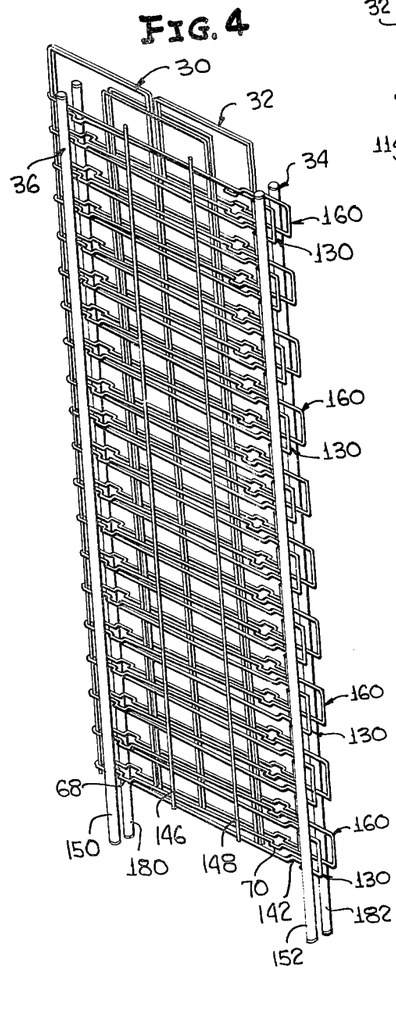
FIG. 4 is a top perspective view illustrating the framework in its folded position.
Figure 5:
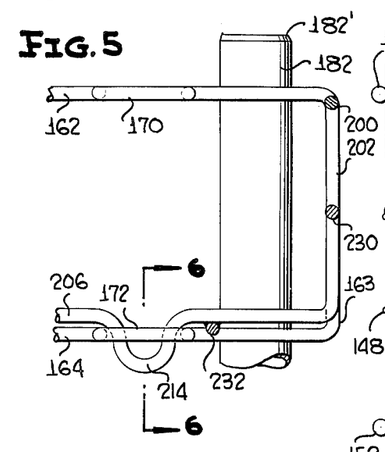
FIG. 5 is a sectional view taken substantially along line 5—5 of FIG. 2 looking in the direction of the arrows.
Figure 6:
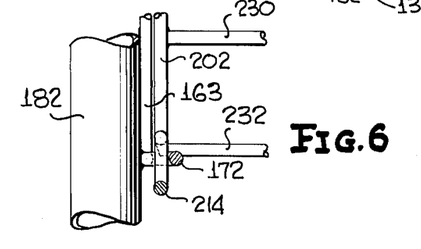
FIG. 6 is a sectional view taken substantially along line 6—6 of FIG. 5 looking in the direction of the arrows.

The completely folded position of the supporting framework is also indicated in perspective in FIG. 4, and it will be apparent that in this position the various panels are disposed substantially parallel with one another and occupy a minimum of space.

Referring again in particular to FIG. 2 of the drawings, it will be noted that each of the shelves includes rear corner portions 209 and 211 which are rounded as seen from the top. These rounded corners permit the shelves to be readily mounted in the operative assembled position shown, and in addition these rounded corners facilitate removal of the shelves and adjustment thereof to a different level on the supporting framework as desired.

It will also be noted that the two back panels are of substantially identical construction such that there is no necessity for constructing the two back panels in any different manner whatsoever, thereby facilitating manufacture of these back panels.

It will be noted as seen particularly in FIG. 1 that when the rack is in its erected position, the horizontal members 66 and 104 are substantially aligned with one another in a horizontal plane with the end portions secured to the side edge members 66 and 90 respectively disposed adjacent one another. The back panels 30 and 32 are adapted to freely swing into substantially planar relationship with one another as seen in FIG. 1. As noted above, the rack may also be folded into the position shown in FIG. 4, the back panels being swingable toward one another as seen in FIG. 3. Swinging movement of the back panels 30 and 32 as seen in FIG. 1 in a direction opposite to that indicated in FIG. 3 is limited due to the fact that the adjacent end portions of members 66 and 104 are adapted to engage one another to thereby limit pivotal movement of the back panel members in a direction other than that shown in FIG. 3. This is advantageous since when erecting the rack this intercooperation assists in initially positioning the back panels in substantially planar relationship as desired. Additionally, when the rack is disassembled and being folded up, this intercooperation prevents inexperienced personnel from improperly folding the rack.

Additionally, the side panels are identical with one another with the exception of the position of the tubular support members. In other words, the side panels are manufactured identical with one another, and then when it is determined what sort of support means is to be associated therewith, the support members may be welded in position as shown.

Figures 10, 11, 12, 13, 14:
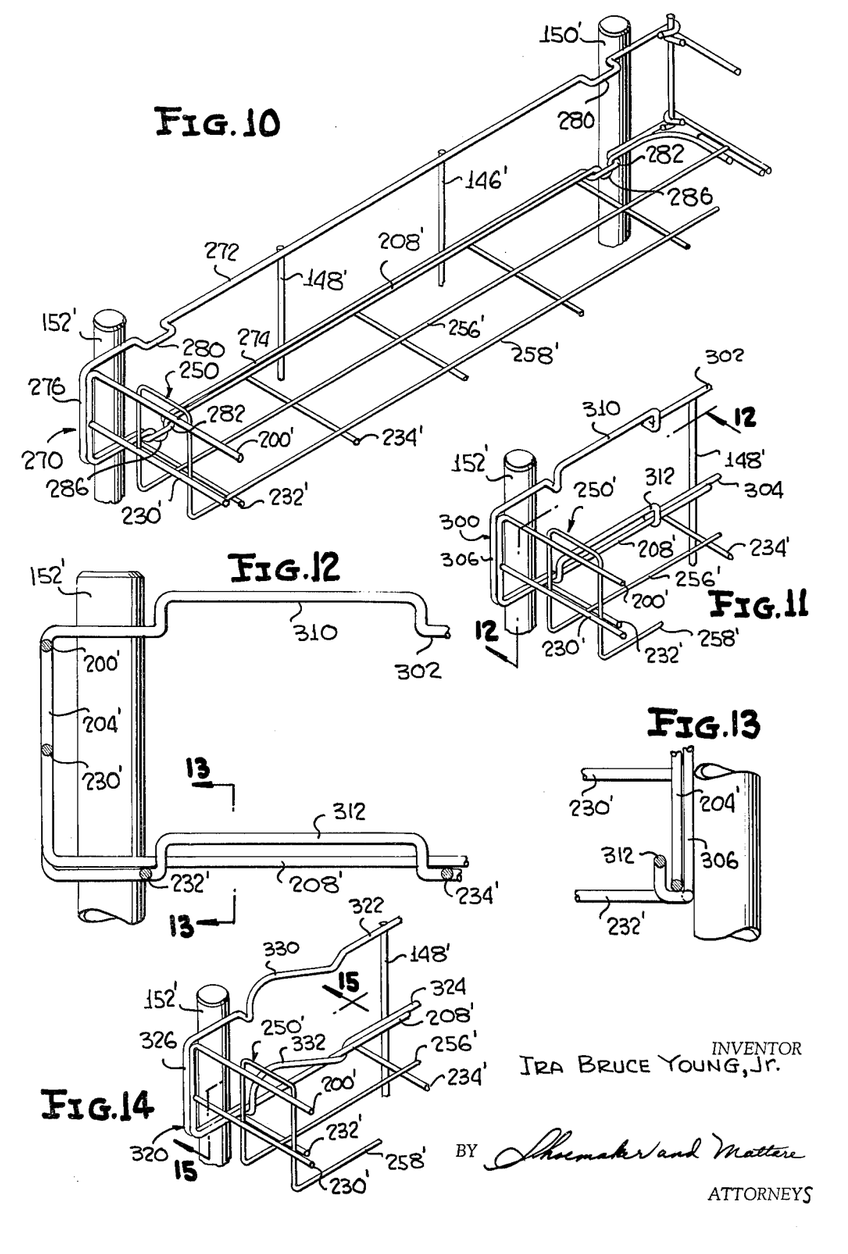
FIG. 10 is a top perspective view of a modified form of the invention.
FIG. 11 is a top perspective view of a still further modified form of the invention.
FIG. 12 is a sectional view taken substantially along line 12—12 of FIG. 11 looking in the direction of the arrows.
FIG. 13 is a sectional view taken substantially along line 13—13 of FIG. 12 looking in the direction of the arrows.
FIG. 14 is a top perspective view of a further modified form of the invention.

Referring now to FIG. 10 of the drawings, a modified form of the invention is illustrated wherein portions of the structure similar to that shown in FIGS. 1 through 9 inclusive have been given the same reference numerals primed. It will be noted that the same support portions 150′ and 152′ are provided as well as the vertical members 146′ and 148′, a member 270 replacing the member 130 as employed in the side panel structure of the previous modification.

In this latter modification as shown in FIG. 10, the generally U-shaped member 270 includes an upper leg portion 272 and a lower leg portion 274, these leg portions being joined by a connecting portion 276. The only difference between these leg portions and those of the members 130 previously described is the fact that the upper leg portion 272 is provided with two inwardly extending offset portions 280 rather than one as in the previous modification. In a similar manner the lower leg portion 274 is provided with a pair of inwardly extending offset portions 282.

The shelf is substantially the same as that previously described, the only difference being that the edge portion 208′ is provided with a pair of depending offset portions 286 each of which fits within one of the offset portions 282.

It will be apparent that the modification shown in FIG. 10 is very similar to that previously described with the exception that an additional offset portion is provided at either side edge portion of the shelf which cooperates with a corresponding extra offset portion provided on the associated side panel.

Referring now particularly to FIGS. 11 through 13 inclusive, a further modified form of the invention is illustrated, wherein components similar to those shown in FIGS. 1 through 9 inclusive have been given the same reference numerals primed. It will be seen that in this modification, the shelf is of substantially the same construction as that previously described, with the exception that the side portion 208′ is not provided with a depending offset portion as was the case in the first described modification.

In the modification shown in FIGS. 11 through 13 inclusive, a member 300 has been substituted for the member 130 previously described, member 300 including upper and lower leg portions 302 and 304 which are interconnected by a connecting portion 306. Leg portions 302 and 304 are provided with upwardly extending offset portions 310 and 312 which lie in a vertical plane disposed inwardly of the plane within which the leg portions 302 and 304 are disposed.

It will be noted in this modification that an open portion of the lower part of the shelf is adapted to fit over one of the offset portions 310 or 312, member 208' resting upon the inwardly extending portions of these offset portions, and the cross members 232' and 234' limiting movement of the shelf with respect to the associated offset portions.

Figure 15:
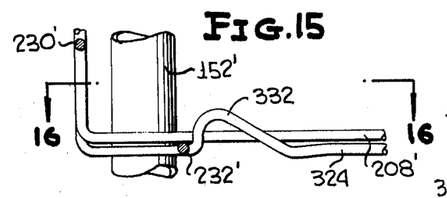
FIG. 15 is a sectional view taken substantially along line 15—15 of FIG. 14 looking in the direction of the arrows.
Figure 16:
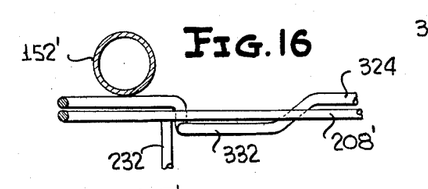
FIG. 16 is a sectional view taken substantially along line 16—16 of FIG. 15 looking in the direction of the arrows.

Referring now particularly to FIGS. 14–16 inclusive, a further modified form of the invention is illustrated wherein the similar parts have again been given the same reference characters primed. In this particular modification, the shelf means is of the same construction as that described in connection with FIGS. 11 through 13.

In the modification shown in FIGS. 14 through 16 inclusive, a member 320 has been substituted for member 300 as seen in FIGS. 11 through 13. Member 320 includes upper and lower leg portions 322 and 324 which are joined by a connecting portion 326. Leg portions 322 and 324 are provided with offset portions 330 and 332 respectively which are of a unique construction. It will be seen that each of these offset portions includes an inwardly extending support portion upon which the side member 208' of the shelf is adapted to rest. The innermost part of the offset portion as seen particularly in FIG. 15 includes an upper surface which tapers upwardly and away from the rear panels of the structure, and then tapers downwardly toward the forward portion of the framework or the shelf.

It will be noted that the shelf rests in such a position that the cross members 232' and 234' will restrict movement of the shelf with respect to the offset portions on the side panel. In other respects, the operation of this particular modification is the same as that previously described, and the shelves may be readily adjusted into different positions as desired.

Figure 17:
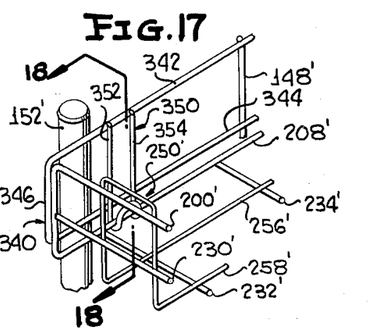
FIG. 17 is a top perspective view of another form of the invention.
Figure 18:
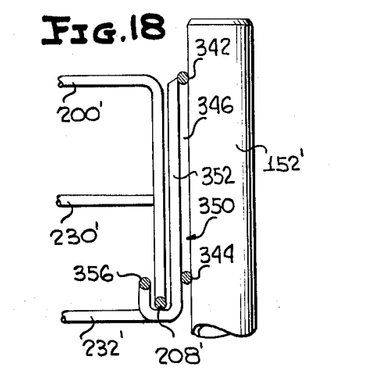
FIG. 18 is a sectional view taken substantially along line 18—18 of FIG. 17 looking in the direction of the arrows.

Referring now particularly to FIGS. 17 and 18 of the drawings, a still further modified form of the invention is illustrated where similar parts have again been given the same reference numerals primed. In this modification, the shelf means is again identical with that shown in FIGS. 11 through 13 as well as in FIGS. 14 through 16.

A member 340 has been substituted in this modification for the member 130 disposed on the side panel 36, and member 340 includes upper and lower leg portions 342 and 344 which are interconnected by a connecting portion 346. The upper and lower leg portions 342 and 344 serve to support a hanger member indicated generally by reference numeral 350.

Hanger member 350 is an integral member bent into the configuration shown so as to define a pair of spaced parallel leg portions 352 and 354 which are joined by an inwardly extending arcuate support portion 356 and upon which the side edge member 208' of the shelf is adapted to rest.

It is apparent that the shelf may simply be lowered into the position as illustrated on the drawing whereupon the side edge members of the shelf will be supported on one or more hanger members, and relative movement between the shelf and the hanger member will be limited by the cross members 232' and 234' of the shelf.

Figure 19:
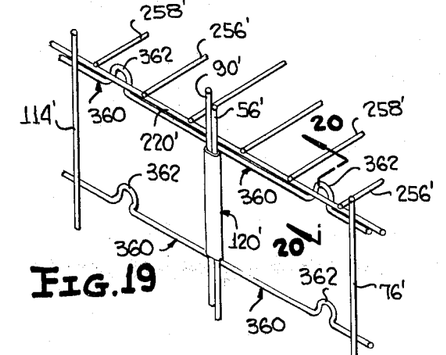
FIG. 19 is a perspective view similar to that shown in FIG. 7 illustrating a further modified form of the invention.
Figure 20:
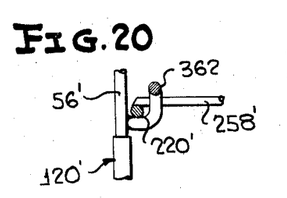
FIG. 20 is a sectional view taken substantially along line 20—20 of FIG. 19 looking in the direction of the arrows.

Referring now particularly to FIGS. 19 and 20 of the drawings, a further modified form of the invention is illustrated, FIG. 19 being similar to FIG. 7 previously described, and similar components have been given the same reference numerals primed. In this modification, the shelf is of similar construction to that previously described with the exception that the rear connecting member 220' as seen in FIGS. 19 and 20 is not provided with the depending offset portions as was the case of the connecting member 220 previously described.

In the modification shown in FIGS. 19 and 20, the connecting member 220' is substantially straight, and the members 66 and 104 of the modification shown in FIG. 7 have been replaced by members 360. Members 360 are provided with inwardly extending offset portions 362 which extend inwardly and then upwardly to define an arcuate arrangement for receiving the rear connecting edge member 220' of the shelf. With this arrangement, it is apparent that the member 220' is adapted to fit within the inwardly offset portions 362 the innermost portions of which are disposed in substantially a vertical plane, whereby the shelf is locked in place and cannot move forwardly with respect to the supporting framework.

Figure 21:
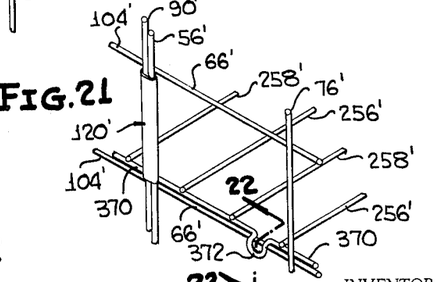
FIG. 21 is a view similar to FIG. 19 illustrating a still further modified form of the invention.
Figure 22:
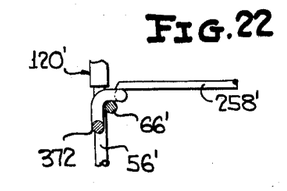
FIG. 22 is a sectional view taken substantially along line 22—22 of FIG. 21 looking in the direction of the arrows.

Referring now particularly to FIGS. 21 and 22 of the drawings, a still further modified form of the invention is illustrated, similar parts having again been given the same reference numerals primed. In this modification, members 66' and 104' correspond to members 66 and 104 previously described with the exception that members 66' and members 104' are not provided with any offset portions thereon.

The shelf means is substantially identical with that previously described with the exception that the member 220 as for example seen in FIG. 7 has been replaced by member 370 as seen in FIGS. 21 and 22, member 370 including spaced offset portions 372 which extend outwardly from the rear edge portion of the shelf and thence downwardly in the configuration as seen most clearly in FIG. 22 to define an arcuate offset portion which fits downwardly behind the associated member on the panel so as to lock the shelf in operative position.

In each of the various modifications, a particular combination of elements has been combined, but it is apparent that various combinations of the offset portions both on the side and back panels as well as on the side and back edge portions of the shelf means may be combined with one another so as to provide the desired end results.

It is apparent from the foregoing that there is provided according to the present invention a new and novel display rack which is composed of a plurality of separate components which may be quickly and easily assembled and disassembled with respect to one another. Both the supporting framework as well as the shelves of the apparatus are of a lightweight open framework type construction which can be easily packaged or stored in a minimum amount of space and which can be shipped economically. The supporting framework itself can be folded up into a very compact arrangement, and these separate shelves may be nested with one another and stacked into a small space. The shelves and the supporting framework are provided with interengageable locking portions in the form of offset portions formed integral with the shelves and the support framework, these interengageable portions serving to hold the assembled display rack in a substantially rigid arrangement such that the shelves are properly supported and the overall unit will be maintained in the proper erected position. The shelves are provided with rounded rear corner portions which permit ready installation and adjustment of the shelves when it is desired to change their vertical position in the apparatus. The two back panels of the apparatus are of substantially identical construction, and the general side panel arrangement is the same, the only difference between the two side panels being the fact that the tubular support portions are differently arranged with respect to the remaining portions of the side panels. This similarity in the various panels of the assembly greatly simplifies the manufacturing of the apparatus and results in lower costs.

Means is provided both on the supporting framework and on the shelves themselves for supporting suitable display items, these display items being held in such a position as to be readily visible to an observer standing in front of the display rack. The overall arrangement is in addition quite simple and inexpensive in construction, yet quite sturdy and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A display rack comprising an open lightweight framework formed of a plurality of wire members rigidly interconnected with one another at certain points and including support portions for supporting it on a support surface, said framework including a pair of back panels of substantially identical configuration, said back panels including opposite side edge members, each of said back panels including a plurality of horizontal members extending between the opposite side edge members of the associated panel and having the opposite ends thereof secured to said opposite side edge members of the associated panel, the side edge member of one of said back panels being disposed in side-by-side adjacent relationship to the side edge member of the other of said back panels, hinge means pivotally interconnecting said side-by-side side edge members to one another for pivotal movement with respect to one another, the horizontal members of one back panel being substantially aligned with the horizontal members of the other back panel when the rack is in erected position so that the adjacent end portions of aligned horizontal members of the back panels are adapted to engage one another upon relative movement of the back panels to limit pivotal movement of the back panels in one direction, a pair of side panels, each of said side panels being swingably connected with the opposite side edge member of each of said back panels, shelf means including a front edge portion and a rear edge portion and a pair of opposite side edge portions, said rear edge portion being disposed adjacent each of said back panels, the opposite side edge portions of said shelf means being disposed adjacent said side panels, each of said panels and each of the rear edge portion and the opposite side edge portions of said shelf means including integral interengageable portions for supporting the shelf means in operative position on the framework and for forming a substantially rigid display rack unit when in the erected operative relationship of the framework and shelf means.

2. Apparatus as defined in claim 1 wherein said adjacent side edge members of the back panels are pivotally connected to one another by a plurality of separate hinge members each of which is disposed in surrounding relationship to the adjacent side edge members of the back panels.

3. A display rack comprising an open lightweight framework formed of wire members rigidly interconnected with one another at certain points, said framework including a pair of identical back panels, each of said back panels including a pair of opposite side edge members, each of said back panels including a plurality of horizontal members extending between the opposite side edge members of the associated panel and having the opposite ends thereof secured to said opposite side edge members of the associated panel, first side edge members of each of said back panels being disposed in side-by-side adjacent relationship, a plurality of separate hinge members, each of said separate hinge members being disposed about said first side edge members of the back panels to pivotally interconnect the back panels with one another, the horizontal members of one back panel being substantially aligned with the horizontal members of the other back panel when the rack is in erected position so that the adjacent end portions of aligned horizontal members of the back panels are adapted to engage one another upon relative movement of the back panels to limit pivotal movement of the back panels in one direction, a pair of side panels, each of said side panels including members extending therefrom and being looped around second side edge members of one of said back panels whereby a side panel is swingably interconnected with the second side edge members of each of said back panels, said back panels lying substantially in a plane when the framework is in erected operative relationship, each of said side panels extending substantially normally from its associated back panel when the rack is in its erected operative position, shelf means, said shelf means including a front edge portion and a rear edge portion and a pair of opposite side edge portions, said rear edge portion being disposed adjacent each of said back panels, the opposite side edge portions of said shelf means being disposed adjacent said side panels, said shelf means including a main supporting portion which is supported on said framework, each of said panels and each of the rear edge portion and the opposite side edge portions of said shelf means including integral interengageable portions for supporting the shelf means in operative position on the framework and for forming a substantially rigid display rack unit when in the erected operative relationship of the framework and shelf means.

4. Apparatus as defined in claim 3 wherein said interengageable portions include inwardly extending offset portions formed on certain members of each of said panels and lying substantially in a horizontal plane in the normal operative position of the apparatus, and depending offset portions formed on certain edge portions of said shelf means and lying substantially in a vertical plane when in the normal operative position of the display rack, said last-mentioned offset portions fitting within said first-mentioned offset portions.

5. Apparatus as defined in claim 4 wherein each of said side panels includes a pair of said offset portions in a particular horizontal plane, and each of said shelf means includes a pair of said offset portions in a particular vertical plane and wherein each of the offset portions on said shelf means fits within an offset portion formed on said framework.

6. Apparatus as defined in claim 3 wherein said interengageable portions include portions formed on certain members of said panels, these last-mentioned portions extending inwardly for a certain distance in a substantial horizontal plane when in the normal position of the rack and including a terminal portion extending upwardly in a substantial vertical plane when the display rack is in its normal operative position, said shelf means including open framework edge portions adapted to fit over said offset portions formed on the panels.

7. Apparatus as defined in claim 3 wherein said interengageable portions include inwardly extending offset portions formed on certain members of said panels, said offset portions extending inwardly in a substantial horizontal plane for a certain distance when the display rack is disposed in its operative position and including innermost portions extending in a substantially vertical plane when the rack is in its operative position, each of said offset portions defining a sloping upper edge portion which slopes upwardly away from the back panels and thence downwardly toward the front portion of the display rack.

8. Apparatus as defined in claim 3 wherein said interengageable portions include a hanger member supported on the inner face of each of said side panels, said hanger member defining an arcuate supporting portion extending inwardly of the associated side panel and adapted to receive a side edge portion of a shelf means.

9. Apparatus as defined in claim 3 wherein said interengageable portions include inwardly extending offset portions formed on certain members of said back panels, said inwardly extending portions defining an arcuate supporting portion for receiving a back edge portion of an associated shelf means.

10. Apparatus as defined in claim 3 wherein said interengageable portions include an outwardly extending offset portion formed on the rear edge portion of said shelf means and defining an arcuate support portion adapted to be received on one of the members of said back panels.

References Cited by the Examiner

UNITED STATES PATENTS

| | | | |
|---|---|---|---|
| 325,850 | 9/1885 | Mecke | 108—99 |
| 1,559,064 | 10/1925 | Bitney | 211—181 |
| 1,612,903 | 1/1927 | Bitney | 211—181 |
| 2,100,548 | 11/1937 | Maxin | 108—59 |
| 2,529,267 | 11/1950 | Sloane | 211—181 |
| 2,680,522 | 6/1954 | Temple | 108—59 |
| 2,952,300 | 9/1960 | Cohen | 297—248 |
| 3,025,105 | 3/1962 | Nash | 297—248 |
| 3,091,345 | 5/1963 | Hoose et al. | 108—111 |
| 3,101,148 | 8/1963 | Brown | 108—111 |
| 3,133,762 | 5/1964 | Newman | 297—248 |
| 3,145,846 | 8/1964 | Samuels et al. | 211—181 |

FOREIGN PATENTS

| | | |
|---|---|---|
| 72,200 | 10/1959 | France. (Addition) |
| 1,128,656 | 8/1956 | France. |
| 1,250,525 | 12/1960 | France. |

FRANK B. SHERRY, *Primary Examiner.*

F. K. ZUGEL, *Assistant Examiner.*